H.C. Stouffer.
Hay Loader.
Nº 96996. Patented Nov. 16 1869.
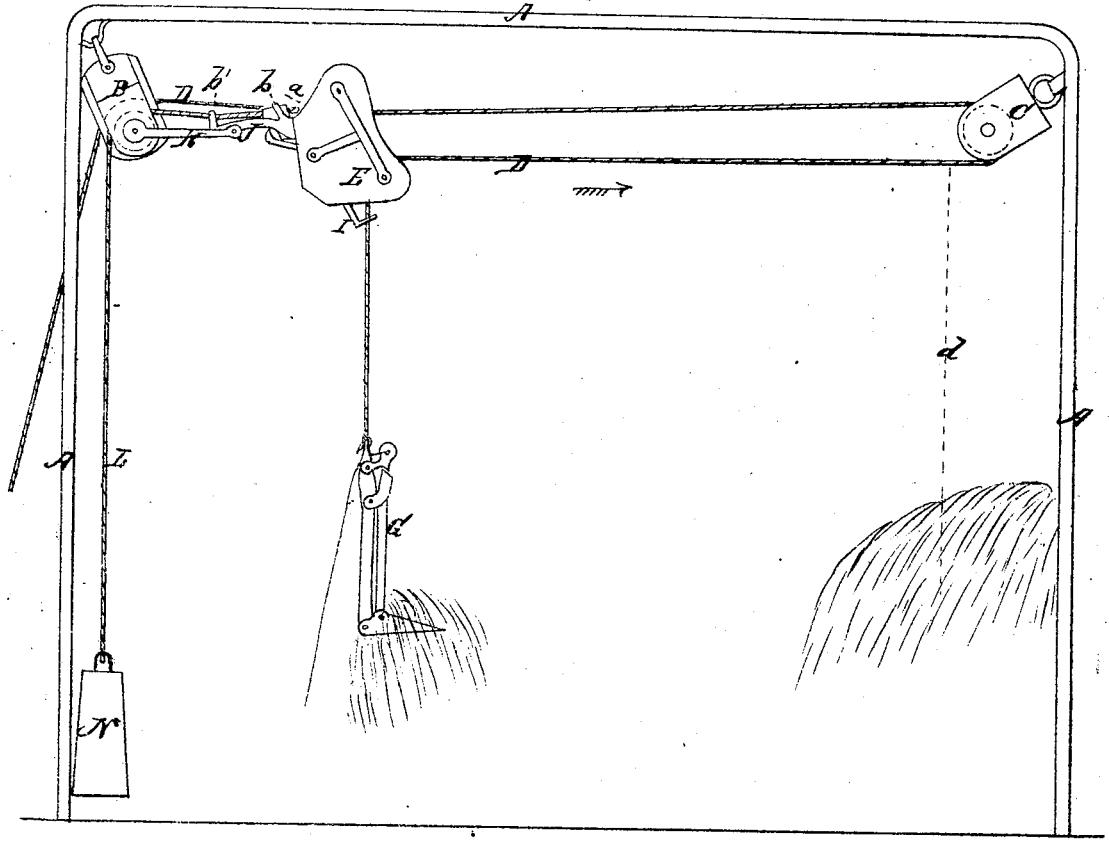
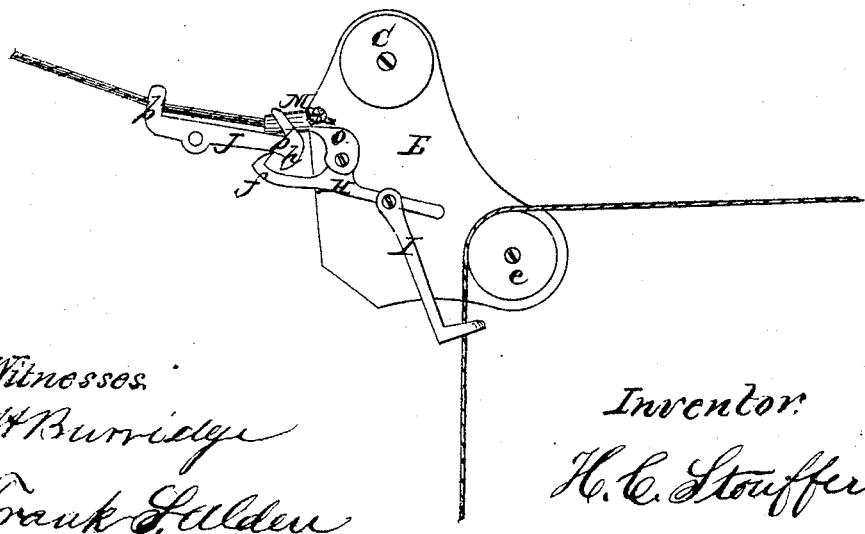
Witnesses.
J.W. Burridge
Frank Selden
Inventor.
H.C. Stouffer

UNITED STATES PATENT OFFICE.

HIROM C. STOUFFER, OF EAST LEWISTON, ASSIGNOR TO GEORGE SMITH, OF LOWELLVILLE, OHIO.

IMPROVEMENT IN HAY-ELEVATORS.

Specification forming part of Letters Patent No. 96,986, dated November 16, 1869; antedated May 17, 1869.

*To all whom it may concern:*

Be it known that I, HIROM C. STOUFFER, of East Lewiston, in the county of Mahoning and State of Ohio, have invented certain new and useful Improvements in Hay-Loaders; and I do hereby declare that the following is a full and complete description of the same, reference being had to the accompanying drawings, making a part of this specification, in which—

Figure 1 is a side view of the loader; Fig. 2, a detached section.

Like letters of reference refer to like parts in the several views presented.

This invention has for its object the taking of hay from the load and elevating and transferring the same therefrom to the bay or other place of deposit by means of certain devices hereinafter more fully described, the same being an improvement of a former machine for which a patent was granted to me.

In Fig. 1, A represents the inside of a barn or other place for the storage of hay, to the beam of which are attached, at some convenient points, pulleys B and C, over and around which is rove a rope, D, one end of which is attached to the block E at the point $a$, whereas the opposite end F is attached to the horse or team, whereby the apparatus is worked and the loaded fork G elevated and conveyed to the place of deposit, as will hereinafter be shown. Within the block E, referred to, is pivoted a hooked lever, H, Fig. 2. To the inner end of said lever is pivoted a trip, I. J is a catch connected to the pulley B through the intervention of a yoke, K. At each end of said catch is a loop, $b$, through which the rope L is rove, the inner end of which is threaded in the tube M, whereas to the opposite end is attached a weight, N. The sleeve or tube referred to is connected in a rigid manner to the block E by means of the arm O, Fig. 2, the purpose of which will presently be shown. As above said, the rope D passes over the pulley B, thence through the block E under the wheel $c$, Fig. 2, from thence over to and around the pulley C, from thence back through the block E over the wheel $e$, through a loop in the end of the trip I, to the fork G.

The opposite end, as before said, is attached to the team.

The practical operation of this loader is as follows, viz: The fork is drawn down and thrust into the load of hay immediately below. This being done, the fork is drawn upward by the team until the upper end of the same engages with the lower end of the trip I, which, on being pushed upward by the ascent of the fork, disengages the hook $f$ from the lug $h$ of the catch J, which will allow the block to be drawn back in direction of the arrow to the dotted line $d$, carrying with it the fork and hay. Said fork is then sprung, and the hay drops into the place of deposit. The fork is then drawn back by the weight N and the operation again repeated as before.

In my former machine the tripping device corresponding to H I was arranged on the outside of the block by means of a bifurcated trip and lever. That arrangement was not only quite expensive and difficult to construct, but was liable to become tangled in the hay, thereby obstructing the freedom of its operation; also, the bolts whereby the trip and levers were secured to the block, in consequence of their length, would bend, and thereby prevent the pivotal action of the lever and trip and render the apparatus inoperative. To avoid these objections I have in this machine arranged the lever and trip on the inside of the block, and in so doing rendered the construction not only more simple, but much easier to make, therefore less expensive and more certain in its operation, as it cannot get out of proper working condition nor become clogged by tangling in the hay.

In my former apparatus the rope L was attached directly to the block by a simple loop and knot, the result of which was that when the block E was returned the hook of the lever corresponding to the lever H did not always catch upon the lug or lip, whereby the block was retained over the load during the charging of the fork. The block would be often drawn back more or less sidewise toward the catch. Therefore the hook would not become engaged therewith unless compelled to do so by the hands. To avoid this difficulty I have passed the end of the rope through the tube M, projecting rigidly forward beyond the block. Now, when the block is brought back and approaches the catch J, the end of the tube enters the loop b, thereby keeping the block in direct line with the rope and catch, so that it cannot swerve either way; hence the hook of the lever H will, in every instance, be brought to the lug h of the catch and become engaged therewith.

What I claim as my invention, and desire to secure by Letters Patent, is—

The combination of the tube M, rope L, catch J, with the block E, lever H, and trip I, all constructed and arranged to operate in the manner and for the purpose substantially as described.

HIROM C. STOUFFER.

Witnesses:
J. H. BURRILGE,
E. E. WAITE.